(12) United States Patent
Sukhomlinov

(10) Patent No.: US 11,055,226 B2
(45) Date of Patent: Jul. 6, 2021

(54) MITIGATION OF CACHE-LATENCY BASED SIDE-CHANNEL ATTACKS

(71) Applicant: Intel Corporation, Santa Clara, CA (US)

(72) Inventor: Vadim Sukhomlinov, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 102 days.

(21) Appl. No.: 16/022,782

(22) Filed: Jun. 29, 2018

(65) Prior Publication Data

US 2019/0042446 A1 Feb. 7, 2019

(51) Int. Cl.
| | |
|---|---|
| *G06F 12/00* | (2006.01) |
| *G06F 12/08* | (2016.01) |
| *G06F 13/00* | (2006.01) |
| *G06F 12/0875* | (2016.01) |
| *G06F 12/1027* | (2016.01) |
| *G06F 21/55* | (2013.01) |
| *G06F 12/0897* | (2016.01) |

(52) U.S. Cl.
CPC ...... *G06F 12/0875* (2013.01); *G06F 12/0897* (2013.01); *G06F 12/1027* (2013.01); *G06F 21/556* (2013.01); *G06F 2212/452* (2013.01); *G06F 2212/50* (2013.01)

(58) Field of Classification Search
CPC .......................... G06F 12/0875; G06F 12/0897
USPC ......................................................... 711/125
See application file for complete search history.

(56) References Cited

U.S. PATENT DOCUMENTS

| | | | |
|---|---|---|---|
| 4,394,731 A | 7/1983 | Flusche et al. | |
| 5,847,991 A * | 12/1998 | Tong | G11C 11/5621 365/185.03 |
| 6,055,605 A | 4/2000 | Sharma et al. | |
| 6,219,760 B1 | 4/2001 | McMinn | |
| 6,324,622 B1 * | 11/2001 | Okpisz | G06F 12/0811 711/141 |

(Continued)

FOREIGN PATENT DOCUMENTS

| | | |
|---|---|---|
| DE | 102018004727 A1 | 1/2019 |
| JP | 2000347933 A | 12/2000 |

OTHER PUBLICATIONS

Non Final Office Action in U.S. Appl. No. 15/640,060 dated Feb. 7, 2019, 13 pages.

(Continued)

*Primary Examiner* — Mohamed M Gebril
(74) *Attorney, Agent, or Firm* — Patent Capital Group

(57) ABSTRACT

Particular embodiments described herein provide for an electronic device that can be configured to receive a request for data, wherein the request is received on a system that regularly stores data in a cache and provide the requested data without causing the data or an address of the data to be cached or for changes to the cache to occur. In an example, the requested data is already in a level 1 cache, level 2 cache, or last level cache and the cache does not change its state. Also, a snoop request can be broadcasted to acquire the requested data and the snoop request is a read request and not a request for ownership of the data. In addition, changes to a translation lookaside buffer when the data was obtained using a linear to physical address translation is prevented.

25 Claims, 11 Drawing Sheets

(56) References Cited

U.S. PATENT DOCUMENTS

| | | | |
|---|---|---|---|
| 6,763,424 B2* | 7/2004 | Conley | G06F 12/0246 365/185.11 |
| 7,236,000 B1* | 6/2007 | Steiner | H03K 19/0033 326/10 |
| 7,254,691 B1* | 8/2007 | Ebeling | G06F 12/0646 341/100 |
| 7,325,090 B2* | 1/2008 | Ronen | G11C 11/406 711/103 |
| 7,444,563 B2* | 10/2008 | Hazama | G06F 11/1072 365/201 |
| 7,535,787 B2* | 5/2009 | Elmhurst | G11C 16/3418 365/185.09 |
| 7,542,344 B2* | 6/2009 | Kim | G11C 11/5628 365/185.03 |
| 7,546,420 B1* | 6/2009 | Shar | G06F 9/30174 711/133 |
| 7,580,277 B2* | 8/2009 | Fuji | G11C 11/406 365/148 |
| 7,711,890 B2* | 5/2010 | Lasser | G11C 11/5628 711/103 |
| 7,945,825 B2* | 5/2011 | Cohen | G11C 16/3404 714/721 |
| 7,996,614 B2* | 8/2011 | Dinkjian | G06F 12/0831 711/118 |
| 8,031,521 B1* | 10/2011 | Yang | G11C 16/06 365/185.02 |
| 8,031,522 B2* | 10/2011 | Jang | G11C 11/5671 365/185.03 |
| 8,595,449 B2* | 11/2013 | Kund | G11C 7/04 711/154 |
| 8,897,066 B2* | 11/2014 | Jung | G11C 16/0483 365/185.03 |
| 8,938,655 B2* | 1/2015 | Hamilton | G11C 16/3431 714/763 |
| 9,070,453 B2* | 6/2015 | Sharon | G11C 16/102 |
| 9,563,425 B2 | 2/2017 | Hughes et al. | |
| 9,847,122 B2* | 12/2017 | Choi | G11C 16/06 |
| 2002/0166065 A1* | 11/2002 | Cheung | G06F 12/1433 726/34 |
| 2004/0047182 A1* | 3/2004 | Cernea | G11C 16/3427 365/185.03 |
| 2004/0090853 A1* | 5/2004 | Perner | G11C 8/18 365/222 |
| 2005/0154836 A1* | 7/2005 | Steely, Jr. | G06F 9/3824 711/137 |
| 2005/0268039 A1 | 12/2005 | Archambault et al. | |
| 2006/0050314 A1* | 3/2006 | Shiga | G11C 16/102 358/1.16 |
| 2006/0080501 A1* | 4/2006 | Auerbach | G11B 19/02 711/112 |
| 2007/0133331 A1* | 6/2007 | Park | G11C 11/40622 365/222 |
| 2007/0183196 A1* | 8/2007 | Gendrier | G11C 16/3431 365/185.03 |
| 2008/0082736 A1* | 4/2008 | Chow | G06F 12/0246 711/103 |
| 2008/0094893 A1* | 4/2008 | Choi | G11C 11/5628 365/185.03 |
| 2008/0109598 A1* | 5/2008 | Schakel | G11C 5/02 711/106 |
| 2008/0137415 A1* | 6/2008 | Lee | G11C 11/5628 365/185.03 |
| 2008/0304327 A1* | 12/2008 | Elmhurst | G11C 16/3418 365/185.25 |
| 2009/0049220 A1* | 2/2009 | Conti | G06F 13/24 710/267 |
| 2009/0113119 A1* | 4/2009 | Oribe | G06F 12/0804 711/103 |
| 2009/0113138 A1* | 4/2009 | Bass | G06F 12/0831 711/144 |
| 2009/0119444 A1* | 5/2009 | Davis | G06F 11/1008 711/103 |
| 2009/0144583 A1* | 6/2009 | Bruennert | G11C 29/44 714/6.32 |
| 2009/0161466 A1* | 6/2009 | Hamilton | G11C 16/10 365/222 |
| 2009/0172294 A1* | 7/2009 | Fryman | G06F 12/0817 711/141 |
| 2009/0172304 A1* | 7/2009 | Gueron | G06F 21/556 711/154 |
| 2010/0293420 A1* | 11/2010 | Kapil | G06F 12/0815 714/710 |
| 2010/0301896 A1* | 12/2010 | Nirschl | H01L 27/2481 326/8 |
| 2011/0145485 A1* | 6/2011 | Chun | G06F 12/0246 711/103 |
| 2011/0153944 A1* | 6/2011 | Kursawe | G06F 12/0802 711/122 |
| 2012/0047333 A1* | 2/2012 | Kottapalli | G06F 12/0817 711/146 |
| 2012/0099389 A1* | 4/2012 | Park | G11C 29/808 365/200 |
| 2012/0117335 A1* | 5/2012 | Bryant | G06F 9/3857 711/146 |
| 2012/0246392 A1* | 9/2012 | Cheon | G06F 12/0638 711/103 |
| 2014/0068175 A1* | 3/2014 | Kaplan | G06F 12/1027 711/108 |
| 2014/0259161 A1* | 9/2014 | Kastner | G06F 21/556 726/22 |
| 2016/0055083 A1 | 2/2016 | Rozario et al. | |
| 2016/0092366 A1 | 3/2016 | Pal et al. | |
| 2016/0110287 A1 | 4/2016 | Bronson et al. | |
| 2016/0170889 A1* | 6/2016 | Lee | G06F 12/0862 711/118 |
| 2016/0179672 A1 | 6/2016 | Dell et al. | |
| 2016/0357664 A1 | 12/2016 | Reed | |
| 2017/0010829 A1* | 1/2017 | Chen | G06F 3/0622 |
| 2017/0177498 A1* | 6/2017 | Wilkes | G06F 12/1027 |
| 2017/0242680 A1* | 8/2017 | Angus | G06F 21/572 |
| 2018/0046808 A1* | 2/2018 | Cammarota | G06F 21/75 |
| 2018/0293693 A1 | 10/2018 | Ray et al. | |
| 2019/0004958 A1 | 1/2019 | Vasudevan et al. | |
| 2019/0042428 A1* | 2/2019 | Guthrie | G06F 12/0891 |
| 2019/0042446 A1* | 2/2019 | Sukhomlinov | G06F 21/556 |
| 2019/0272239 A1* | 9/2019 | Hagersten | G06F 12/1475 |
| 2019/0303303 A1 | 10/2019 | Krishnan et al. | |

OTHER PUBLICATIONS

Final Office Action in U.S. Appl. No. 15/640,060 dated Aug. 1, 2019, 25 pages.
European Search Report and Search Opinion, EP App. No. 19160052.7, dated Aug. 13, 2019, 9 pages.
Notice of Allowance in U.S. Appl. No. 15/640,060 dated Nov. 26, 2019, 10 pages.
Final Office Action in U.S. Appl. No. 15/940,719, dated Aug. 19, 2020, 15 pages.
Non Final Office Action in U.S. Appl. No. 15/940,719, dated Apr. 22, 2020, 14 pages.
Non Final Office Action in U.S. Appl. No. 15/940,719, dated Dec. 23, 2019, 13 pages.
Notice of Allowance in U.S. Appl. No. 15/640,060, dated Feb. 20, 2020, 3 pages.

* cited by examiner

MITIGATION OF CACHE-LATENCY BASED SIDE-CHANNEL ATTACKS

TECHNICAL FIELD

This disclosure relates in general to the field of information security, and more particularly, to the mitigation of cache-latency based side-channel attacks.

BACKGROUND

The field of network security has become increasingly important today. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. In addition, a malicious operator that gains access to a system may be able to steal sensitive information or perform any number of other malicious actions. Hence, significant administrative challenges remain for protecting computers and computer networks from malicious and inadvertent exploitation by malicious software or malicious operators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

The following detailed description sets forth examples of apparatuses, methods, and systems relating to a system for the mitigation of cache-latency based side-channel attacks in accordance with an embodiment of the present disclosure. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Figure 1:
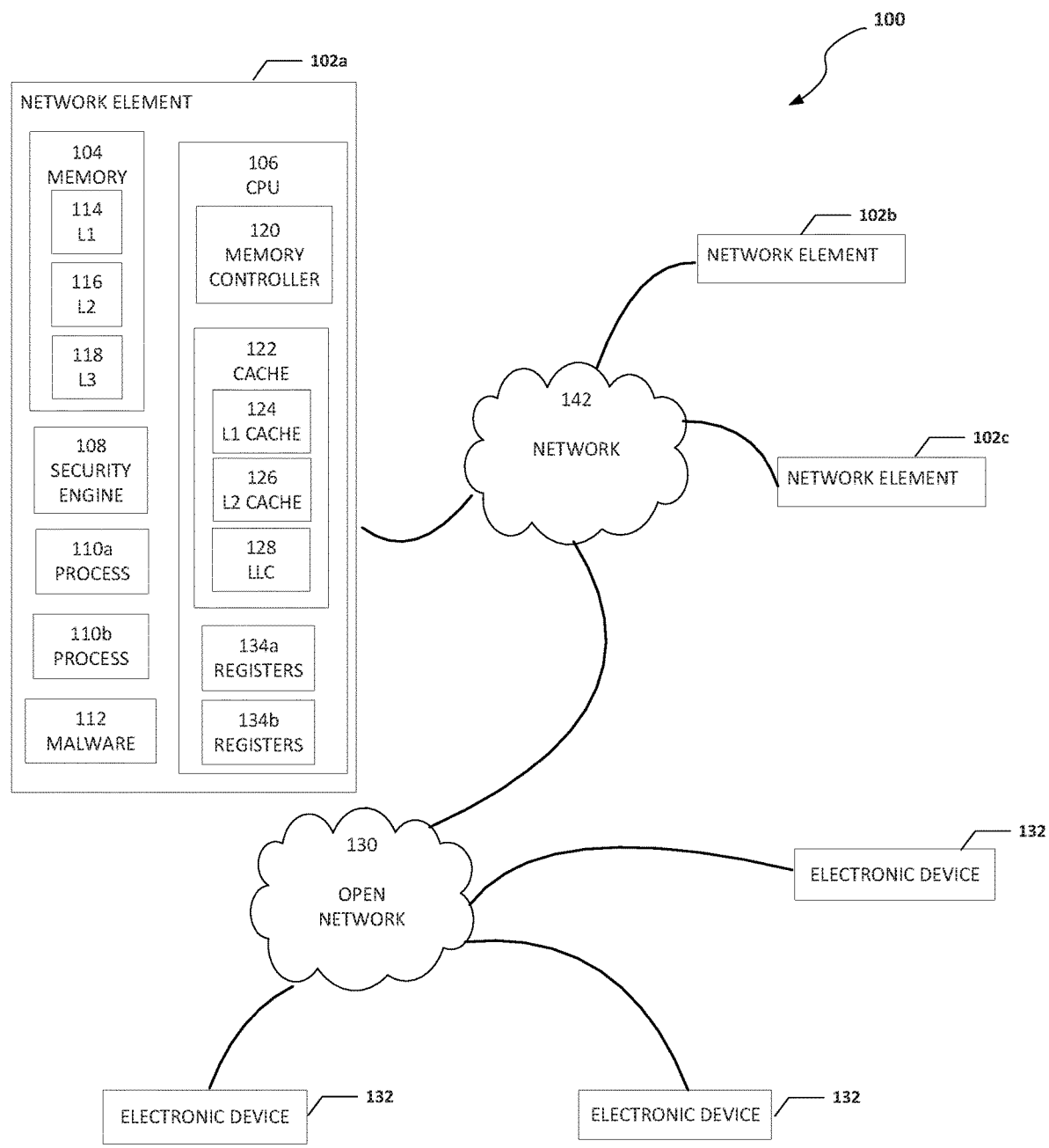
FIG. 1 is a simplified block diagram of a system for the mitigation of cache-latency based side-channel attacks in accordance with an embodiment of the present disclosure.

FIG. 1 is a simplified block diagram of a system 100 to enable the mitigation of cache-latency based side-channel attacks, in accordance with an embodiment of the present disclosure. System 100 can include one or more network elements 102a-102c. Each network element 102a-102c can include memory, one or more processes, a security engine, a memory controller, and a computer processing unit (CPU). For example, as illustrated in FIG. 1, network element 102a can include memory 104, one or more CPUs 106, a security engine 108, and one or more processes 110a and 110b. Memory 104 can include one or more levels of memory. For example, as illustrated in FIG. 1, memory 104 includes level one (L1) memory 114, level two (L2) memory 116, and level three (L3) memory 118. CPU 106 can include a memory controller, cache, and one or more registers. For example, as illustrated in FIG. 1, CPU can include a memory controller 120, cache 122, and registers 134a and 134b. Cache 122 can include one or more levels of cache. For example, as illustrated in FIG. 1, cache 122 can include an L1 cache 124, an L2 cache 126, and a LLC 128.

Registers 134a and 134b include fast accessible storage for use by CPU 106. Registers 134a and 134b are at the top of a memory hierarchy and provide the quickest way for CPU 106 to access data. Each of processes 110a and 110b may be a virtual network function (VNF). In an example, each of processes 110a and 110b may be a virtual part of an operating system that runs on part of a cloud network and is configured to run customer's data. In an example, network element 102a can include malware 112.

Network elements 102a-102c may be in communication with each other using network 142. Network 142 may be part of a data center. In an example, network 142 can be in communication with open network 130 (e.g., the Internet). Open network 130 can be in communication with electronic devices 132. Electronic devices 132 may be user equipment, cloud services, or some other type of electronic device that is in communication with network 142 through open network 130.

Elements of FIG. 1 may be coupled to one another through one or more interfaces employing any suitable connections (wired or wireless), which provide viable pathways for network (e.g., network 142) communications. Additionally, any one or more of these elements of FIG. 1 may be combined or removed from the architecture based on particular configuration needs. System 100 may include a configuration capable of transmission control protocol/Internet protocol (TCP/IP) communications for the transmission or reception of packets in a network. System 100 may also operate in conjunction with a user datagram protocol/IP (UDP/IP) or any other suitable protocol where appropriate and based on particular needs.

In an example, when data is requested and/or accessed, system 100 can be configured to use a modified data request or secure request (e.g., LOADMEM described below) to allow for a means of accessing the data without affecting a cache state or causing the cache to change states and to not expose the fact that the data was accessed by a process. The secure request is a modified request for data that is designed to avoid side-effects in caches, memory and TLBs and helps prevent side channel attacks. More specifically, the secure request is a request that modifies a request for data so that evidence of the data being accessed will not be traced in the cache and the data is not moved to a new location or moved in/within caches when the memory access involves a TLB lookup and/or a page-walk. For example, security engine 108 can cause an instruction to be used so that evidence of the data being accessed will not be traced in the cache. This hides the activity related to the data from malware and helps to mitigate against cache-latency based side-channel attacks.

In addition, some types of memory access involve a translation lookaside buffer (TLB) lookup and a page-walk. With a TLB lookup and/or a page walk, there is a possibility to have a side-channel attack due to the speculative execution of the reads to ensure a page permission check is completed before requesting data. System 100 can be configured to use the secure request such that when data is accessed, the data is not moved to a new location or moved in/within caches when the memory access involves a TLB lookup and/or a page-walk. This is achieved by replacing memory accesses to data, whose location should not be disclosed, with a new type of access that uses a special instruction to help guarantee that the requested data will not be moved into any other location. More specifically, a linear to physical translation is guaranteed to be completed before any attempt to request data provided in operands is made. Logical to physical translation ensures that page permissions are also validated and exceptions generated. A page-walk, if needed is also implemented using the secured request, so page directory related memory access will not alter cache content, TLBs, and PMU counters which all can serve as side-channels and may be vulnerable to side channel attacks.

A page walk, or table walk as it is sometimes referred to, involves looking up a linear address mapping in a page table to see whether a mapping to a physical address exists. The term "linear address" includes a virtual address and, as used herein, the terms "linear address" and "virtual address" can be used interchangeably. When a linear address needs to be translated into a physical address, the TLB is searched first. If a match is found (a TLB hit), the physical address is returned and memory access can continue. However, if there is no match (called a TLB miss), then the system will typically look up the address mapping in the page table to see whether a mapping exists (a page walk). If one exists, the address is written back to the TLB, as the hardware accesses memory through the TLB in a virtual memory system.

For purposes of illustrating certain example techniques of system 100, the following foundational information may be viewed as a basis from which the present disclosure may be properly explained. End users have more communications choices than ever before. A number of prominent technological trends are currently afoot (e.g., more computing devices, more connected devices, etc.). One current trend is the use of devices connected to a local network and/or an open network such as the Internet. The Internet has enabled interconnection of different computer networks all over the world. While the use of the Internet has transformed business and personal communications, it can also create a security challenge when trying to protect devices.

For example, cache-latency based side-channel attacks are becoming more of a threat. The reason cache-latency based side-channel attacks exists is because some systems are designed with performance in mind and to cache as much data as possible. Malware exploits the fact that the data is cached because it means that the data was accessed and/or read. In a cache-latency based side-channel attack, malware can monitor what was accessed by a process (e.g., kernel, application, etc.) and determine what data structures were used by the process. Using this information, the malware can determine when data was accessed by a specific process. By analyzing the cache and the timing of access to the data, the malware can determine what data was used by the specific process. In a cache-latency based side-channel attack, the malware will not request the data directly, but will acquire the address of the data based on how the cache was modified. For example, one type of attack is identifying, understanding, determining, etc. the location of system data by analyzing the cache after a system's process was executed. This can allow the malware to know the area where encryption keys are stored or gain knowledge about the control structures used by the operating system or operating environment. The attack by the malware is at a low level and the malware is trying to determine what data structures are being used or modified by a process of interest.

In an example, malware can bring a cache into a known state either by flushing the cache or by bringing some data into the cache and filling the cache with known data (e.g., data that is known by the malware). The malware then waits until a process (e.g., kernel, application, etc.) executes instructions which causes memory to be accessed. Access of the data related to the instruction will modify the cache state. Since malware knows the cache state, it can determine what the modification was, which cache line was modified, and determine the address where data that is associated with the process is located. Malware can use the cache changes to find the address of the data and the malware can use the address to execute a precision attack on the address and/or other addresses around the address. Another side channel attack used by malware can include cache misses and TLB misses associated with memory access attempts and accounted for by a performance monitoring unit (PMU).

When a process reads or writes data, it may affect the cache or more specifically, a cache line. The reading or writing of data will either drop a cache line out of the cache or bring a cache line into the cache. Malware will be able to detect which cache line was brought into the cache or dropped from the cache and will know which address was read or written by the process. By knowing the address, the malware can start a more detailed attack. The malware may try to obtain the data from the address, to modify the data at the address, and/or use some other means to get or modify the contents at the address. The knowledge of the address is important because the address may include protected data (e.g., a security key or be related to a security key).

For example, malware may not have direct access to a browser but can try to obtain encryption keys for a banking application by determining what addresses were accessed by the browser when the banking application was being used. The malware may also be able to determine where encryption keys are stored for https sessions. Once the malware knows the address of the encryption keys, it can use other means to obtain the encryption keys. Also, the malware may determine what memory addresses are used by a kernel for encryption. Knowing the addresses can provide clues to help the malware determine what was being accessed or executed by the kernel and allow the malware to make a more focused attack.

Cache-latency based side-channel attacks are side channel attacks and do not directly attack a system. The attack circumvents memory protection and other measures used to try and prevent direct attacks. Some current solutions to try and mitigate cache-latency based side-channel attacks include the use of registers to load as much data (e.g., encryption keys) into the registers as possible and avoid using memory for storing the data so the data in unencrypted form only exist in the registers. However, the use of registers is limited and only a limited amount of data can be stored. Another current solution involves the use of fake reads where an application may intentionally use more data (e.g., using a lookup table vs. access via index) and spraying carefully designed reads across large chunk of memory. However, fake reads affect performance and the efficiency and effectiveness of the fake reads depends on pattern of the fake reads. What is needed is a means to provide mitigation of cache-latency based side-channel attacks.

A system for the mitigation of cache-latency based side-channel attacks, as outlined in FIG. 1, can resolve these issues (and others). System 100 can be configured to allow for a means of accessing data without affecting a cache state or causing the cache to change states. Security engine 108 can be configured to not expose the fact that data was accessed by a process. When accessing data, security engine 108 can cause an instruction to be used that will help to ensure that the data being accessed will not be left in any caches, or if the data was already present in a cache, the data will be extracted from the cache but not cause any eviction or moving of the cache lines between different levels. The data in the cache will just remain at the existing state and will not move. Malware observing the cache in a cache-latency based side-channel attack will not see any difference in the cache. Currently, if the data is in LLC and the data is requested, the data is moved to L2 or L1 caches and malware can determine what data was accessed. Security engine 108 can be configured to not expose the fact that the data was accessed and to not move or change the cache data hierarchy when the data is accessed. This allows a relatively simple and effective method for avoidance of cache-latency based side-channel attack due to collisions in cache architecture.

When collisions in cache architecture occur, different addresses map to same cache set. An attacker can force a thrashing of data by loading a cache with the malware's own data. Then, the malware can measure the latency to access the malware's own data to identify addresses with higher latency, which would mean data sharing the same cache set was used by a target process. Because the malware forced the cache into a known state, the malware can determine what data was changed by observing changes to the cache. If a process is known to accesses system data and the system data is added to the cache or moved in the cache, the malware will know that the process accessed the system data and can determine the address of the system data from the cache. Once the address of the system data is known, the malware or some other malicious process can target the system data using a direct attack. Security engine 108 can be configured to not displace the data from the cache and therefore avoid of help to prevent a cache-latency based side-channel attack.

In some current systems, if a CPU (or agent) that is executing a process does not own data requested by the process, the CPU (or agent) will use a snoop request for the address of the data and to request ownership of the data. The snoop request is part of a coherency protocol. If the CPU does not own the data locally, before it gets the data from the memory, the CPU sends a broadcast snoop message for the data. The broadcast snoop message is a request for the data and requests ownership of the data and an address of the data. In response to the broadcast snoop message, the data may be moved using a shared bus and the CPU that provided the data will change the internal state of the data and cause a change in the cache that can be detected by the malware. Security engine 108 can be configured to use a modified snoop request that is just a read request, does not change the cache, and is not a request for ownership that would change the cache. If a response to the snoop request is not received, then the CPU will acquire the data from memory using the modified snoop request without affecting the cache. This hides the activity related to the data from the malware and helps to mitigate against cache-latency based side-channel attacks.

In a specific example, system 100 can be configured to avoid cache modifications when dealing with protected data, while relying on total memory encryption technologies (e.g., TME/MK-TME) for data in the rest of the memory. Security engine 108 can use the instruction LOADMEM (and reverse STOREMEM), which behavior is similar to a snapshot load (e.g., MOVNTDQ family with non-temporal access to memory, or MOVGET/MOVPUT to take or modify data in place), but modified to help and try to prevent observable side effects in the memory subsystem. Specific encoding of LOADMEM/STOREMEM as machine-readable instruction can vary, and can include independent instructions or be a prefix to other memory access instructions like MOV, ADD, etc. The LOADMEM instruction is compatible with coherency protocols by first snooping for data and bringing it to core/registers. If the data exist in memory as a snapshot versus a 'Request for Ownership' used in common coherency protocols. In contrast to a MOVGET/MOVPUT instruction, which also implement snapshots, LOADMEM extends the snapshot to multi-level memory access and internal processing such as translation of a linear address to a physical address. If the data is not in the cache (including remote caches) then the operation can be equal to a MOVNTDQ operation, but extended with avoidance of changes in TLB.

The instruction LOADMEM is a secure request or modified request for data and implements a snapshot load, which does not displace data in the cache and memory hierarchy. As a result of the execution of LOADMEM, requested data will not be moved closer to CPU in caches as is typically done with regular memory access. Coherency is preserved by snooping for requested data, using a modified snoop request, without a request for ownership in a way to prevent eviction of data from a remote cache or changing state of remote cache line. Some specific implementations include a request for a write. In these implementations, data is acquired as result of direct transfer from the cache level where it resides, or if it is not in the local cache, the data is acquired with a request for a snapshot from remote caches. If the requested data is not owned by remote cores, the requested data can be directly loaded from memory and delivered directly to a register, leaving no traces in the cache.

The instruction LOADMEM helps to mitigate cache-latency based side-channel attacks by avoiding traces of a memory address for the data in cache while preserving memory coherency. When combined with application-based 'caching' of private data in registers, the performance impact is minimal and at the same time, allows any size of data to be read in a secure way when needed. A 'Read Snapshot' bus transaction can be used to snoop data from other core's caches for LOADMEM and a 'Write Update' bus transaction can be used to modify data in place of STOREMEM. This part of behavior is similar to MOVGET/MOVPUT instructions. If data is not in other caches, a non-temporal read from memory such as MOVNTDQ can be used. As a result, the data can be delivered directly to a register without allocating cache lines.

In addition, system 100 can be configured to allow for a complete logical to physical translation using a TLB if an address is cached in TLB or obtained using a page-walk. This operation itself is using LOADMEM primitive operating on a physical address during a page-walk. As a result of the translation, the processor acquires a physical address to request from cache/memory, obtains access rights and privileges to an area of memory, and receives verification that the current access is legitimate. If it is not legitimate, an exception is generated. Linear to physical translation with LOADMEM follows the same functional steps as a regular memory load, with the only difference being that page-walk related memory accesses are implemented using LOADMEM on the physical address and PMU Events (DTLB misses, etc.) are not generated to avoid exposure of data locations and D-TLB is not updated as a result. LOADMEM physical instruction behavior resembles MOVGET (and STOREMEM—MOVPUT) in the first steps, but, where multi-level memory is present, extends MOVGET with instructions for the memory controller not to bring data from L2 memory (like persistent memory) into L1 memory (e.g., DDR4 DIMM used for caching).

Turning to the infrastructure of FIG. 1, system 100 in accordance with an example embodiment is shown. Generally, system 100 can be implemented in any type or topology of networks. Network 142 represent a series of points or nodes of interconnected communication paths for receiving and transmitting packets of information that propagate through system 100. Network 142 offers a communicative interface between nodes. Network 142 may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In system 100, network traffic, which is inclusive of packets, frames, signals (analog, digital or any combination of the two), data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications (e.g., over a cellular network) may also be provided in system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

Network element 102a-102c are network elements, which are meant to encompass network appliances, servers, routers, switches, gateways, bridges, load balancers, processors, modules, or any other suitable device, component, element, or object operable to exchange information in a network environment. In an example implementation, network elements 102a-102c can include desktop computers, laptop computers, mobile devices, personal digital assistants, smartphones, tablets, wearables, IoTs, or other similar user equipment and/or devices. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regard to the internal structure associated with system 100, each of network elements 102a-102c can include memory elements (e.g., memory 104) for storing information to be used in the operations outlined herein. Each of network elements 102a-102c may keep information in any suitable memory element (e.g., random access memory (RAM), read-only memory (ROM), erasable programmable ROM (EPROM), electrically erasable programmable ROM (EEPROM), application specific integrated circuit (ASIC), non-volatile memory (NVRAM), magnetic storage, magneto-optical storage, flash storage (SSD), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements 102a-102c may include modules (e.g., security engine 108, etc.) to achieve, or to foster, operations as outlined herein. These modules may be suitably combined in any appropriate manner, which may be based on particular configuration and/or provisioning needs. In some embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of network elements 102a-102c may include a processor (e.g., CPU 106) that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Figure 2:
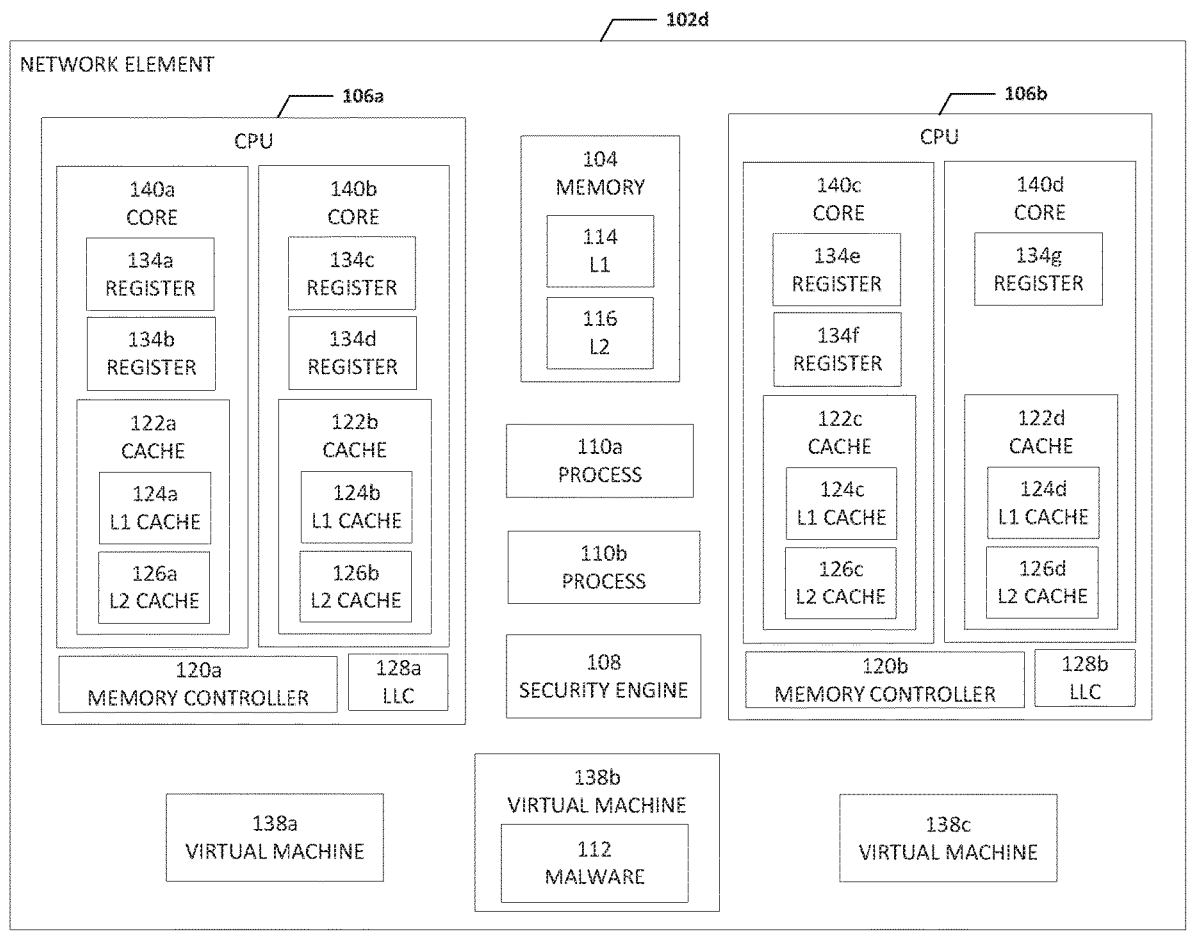
FIG. 2 is a simplified block diagram of a system for the mitigation of cache-latency based side-channel attacks in accordance with an embodiment of the present disclosure.

Turning to FIG. 2, FIG. 2 is a simplified block diagram of network element 102d. As illustrated in FIG. 2, network element 102d can include memory 104, CPUs 106a and 106b, security engine 108, one or more processes 110a and 110b and one or more VMs 138a-138c. In an example, one of the VMs, for example VM 138b, can include malware 112. Memory 104 can include one or more levels of memory. For example, as illustrated in FIG. 2, memory 104 includes L1 memory 114 and L2 memory 116. In some example, memory may include only one level of memory or more than three levels of memory.

Each of CPUs 106a and 106b can include one or more cores, a memory controller, and LLC. For example, as illustrated in FIG. 2, CPU 106a can include cores 140a and 140b, memory controller 120a, and LLC 128a. Memory controller 120a and LLC 128a can be shared by cores 140a and 140b. CPU 106b can include cores 140c and 140d, memory controller 120b, and LLC 128b. Memory controller 120b and LLC 128b can be shared by cores 140c and 140d.

Each core can include one or more registers and a cache. For example, as illustrated in FIG. 2, core 140a can include registers 134a and 134b and cache 122a. Cache 122a can include L1 cache 124a and L2 cache 126a. Core 140b can include registers 134c and 134d and cache 122b. Cache 122b can include L1 cache 124b and L2 cache 126b. Core 140c can include registers 134e and 134f and cache 122c. Cache 122c can include L1 cache 124c and L2 cache 126c. Core 140d can include register 134g and cache 122d. Cache 122d can include L1 cache 124d and L2 cache 126d. With respect to core 140a, caches 122b-122d and LLC 128b are considered remote caches as they are caches outside or remote from core 104a.

VM 138b can have the same access to one or more of caches 122a-122d as other VMs in network element 102d. Malware 112 in VM 138b can attempt a cache-latency based side-channel attack to try and determine what processes the other VMs are executing. Security engine 108 can be configured to not expose caches 122a-122d and LLCs 128a and 128b a cache-latency based side-channel attack from malware 112.

Figure 3:
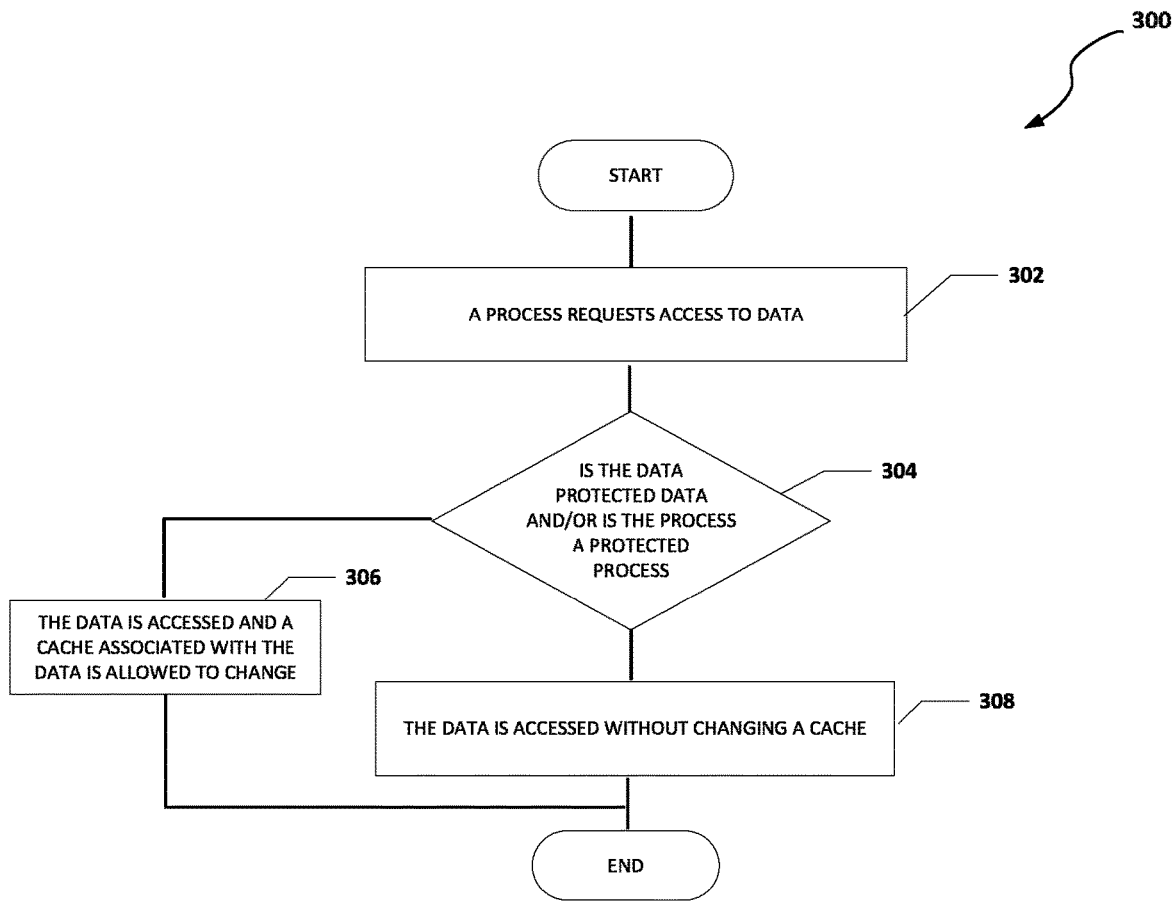
FIG. 3 is a simplified flowchart illustrating potential operations that may be associated with the communication system in accordance with an embodiment.

Turning to FIG. 3, FIG. 3 is an example flowchart illustrating possible operations of a flow 300 that may be associated with the mitigation of cache-latency based side-channel attacks, in accordance with an embodiment. In an embodiment, one or more operations of flow 300 may be performed by security engine 108. At 302, a process requests access to data. At 304, the system determines if the data is protected data and/or if the process is a protected process. If the data is not protected data and/or the process is not a protected process, then the data is accessed and a cache associated with the data is allowed to change, as in 306. If the data is protected data and/or the process is a protected process, then the data is accessed without changing a cache, as in 308. For example, the request to access the data can be modified to a modified request that provides the requested data without causing a change of location of the data in the cache and/or memory. By ensuring that the cache is not changed, malware cannot determine what changes were made to the cache and the malware cannot determine the address of the protected data.

Figure 4:
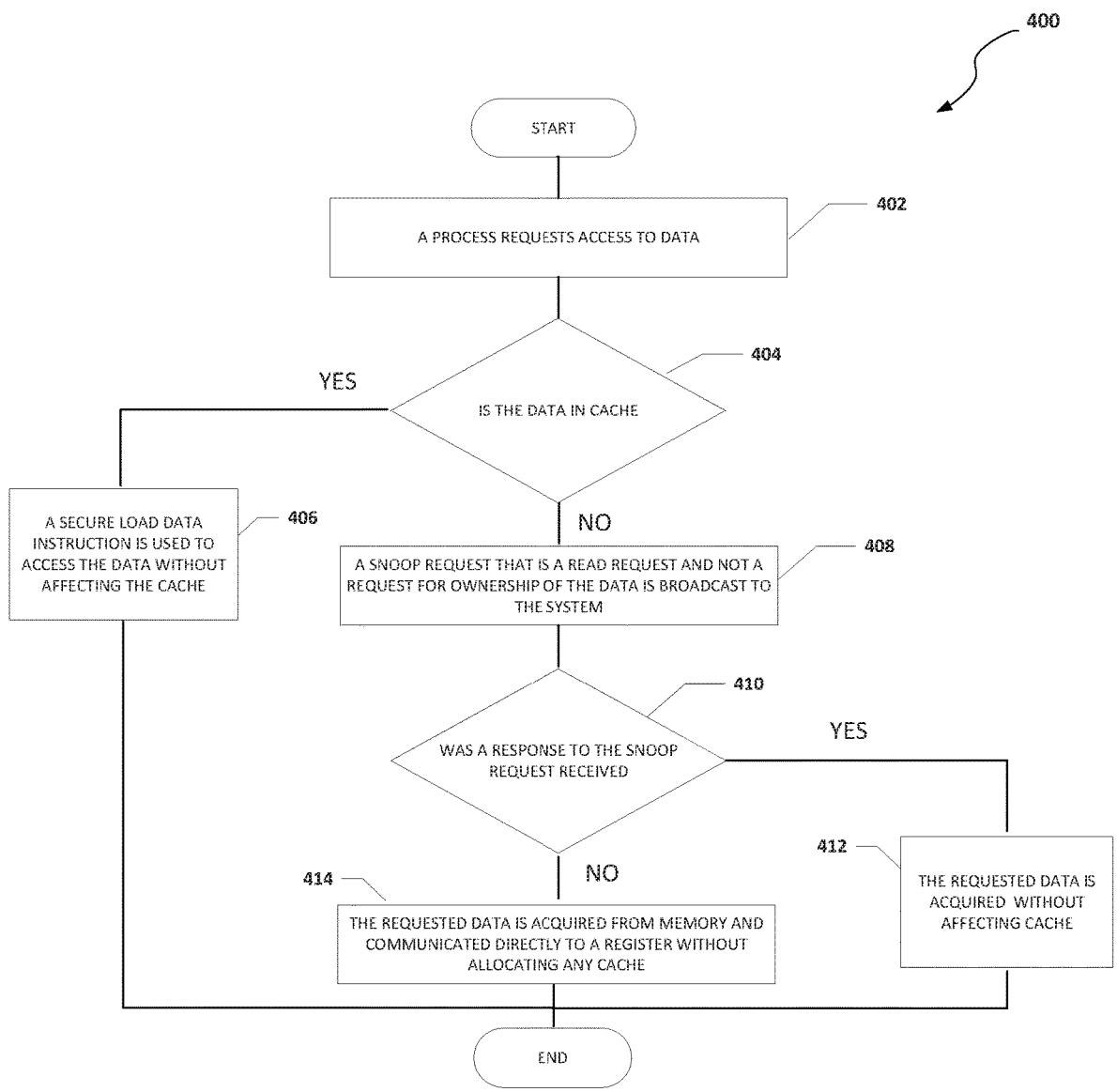
FIG. 4 is a simplified flowchart illustrating potential operations that may be associated with the communication system in accordance with an embodiment.

Turning to FIG. 4, FIG. 4 is an example flowchart illustrating possible operations of a flow 400 that may be associated with the mitigation of cache-latency based side-channel attacks, in accordance with an embodiment. In an embodiment, one or more operations of flow 400 may be performed by security engine 108. At 402, a process requests access to data. At 404, the system determines if the data is in cache. For example, the system may determine if the data is in L1 cache, L2 cache, or LLC. If the data is in the cache, then a secure load data instruction is used to access the data without affecting the cache, as in 406. For example, the secure load instruction can be a modified request for the data that provides the requested data without causing a change of location of the data in the cache and/or memory If the data is not in the cache, then a snoop request that is a read request (e.g. a snoop request that is modified to a remote read request) and not a request for ownership of the data is broadcast to the system, as in 408. At 410, the system determines if a response to the snoop request was received. If a response to the snoop request was received, then the requested data is acquired without affecting the cache, as in 412. If a response to the snoop request was not received, then the requested data is acquired from memory and communicated directly to a register without allocating any cache, as in 414.

Figure 5:
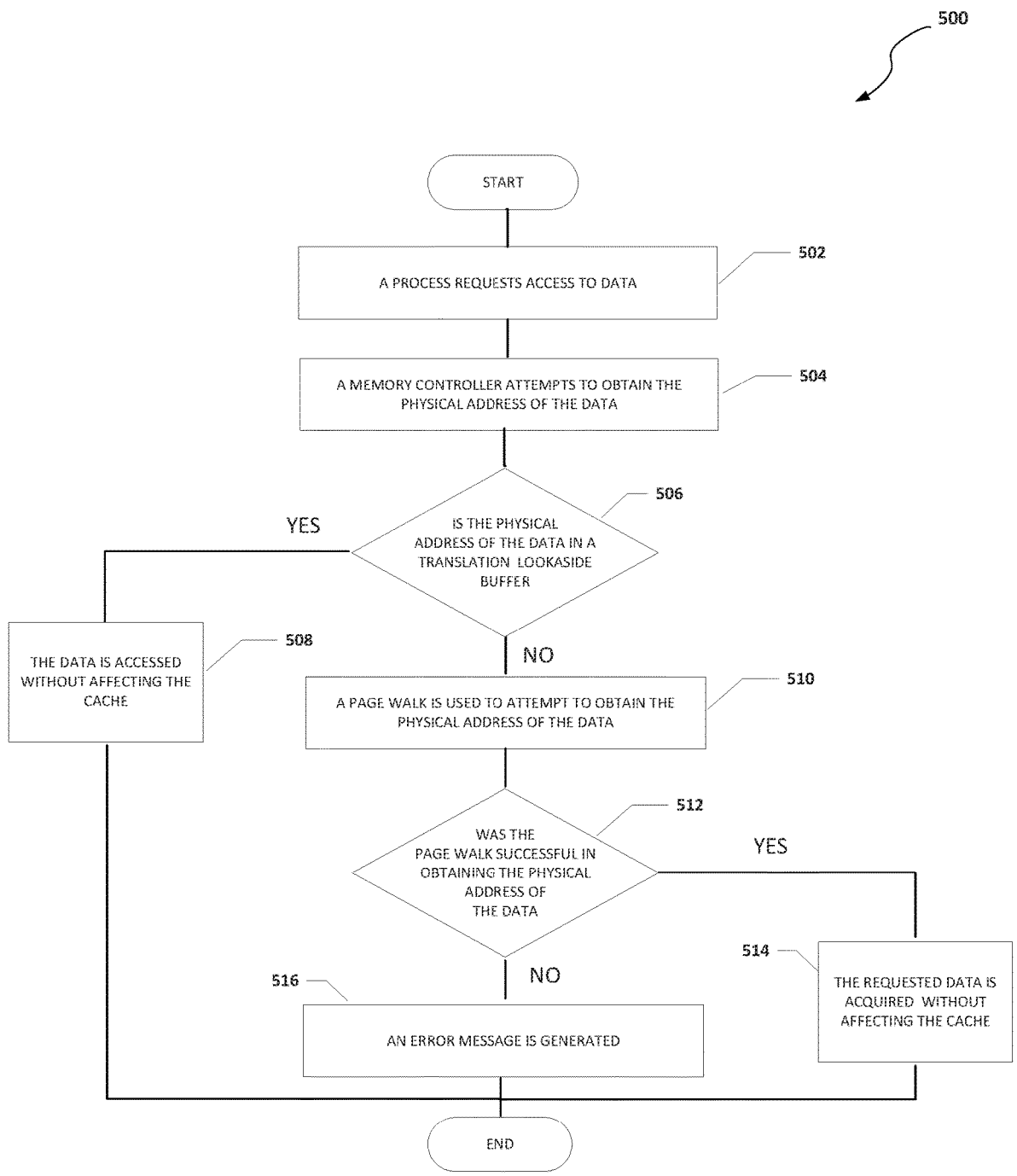
FIG. 5 is a simplified flowchart illustrating potential operations that may be associated with the communication system in accordance with an embodiment.

Turning to FIG. 5, FIG. 5 is an example flowchart illustrating possible operations of a flow 500 that may be associated with the mitigation of cache-latency based side-channel attacks, in accordance with an embodiment. In an embodiment, one or more operations of flow 500 may be performed by security engine 108. At 502, a process requests access to data. At 504, a memory controller attempts to obtain the physical address of the data. At 506, the system determines if the physical address of the data is in a TLB. If the physical address of the data is in the TLB then the data is accessed without affecting the cache, as in 508. For example, the request to access the data can be modified to a modified request that provides the requested data without affecting the cache or causing a change of location of the data in the cache and/or memory. For example, the system may access the data without changing the L1 cache, L2 cache, or LLC. If the data is not in the TLB, then a page walk is used to attempt to obtain the physical address of the data, as in 510. At 512, the system determines if the page walk was successful in obtaining the physical address of the data. If the page walk was successful in obtaining the physical address of the data, then the requested data is acquired without affecting the cache, as in 514. If the page walk was not successful in obtaining the physical address of the data, then an error message is generated, as in 516.

Figure 6:
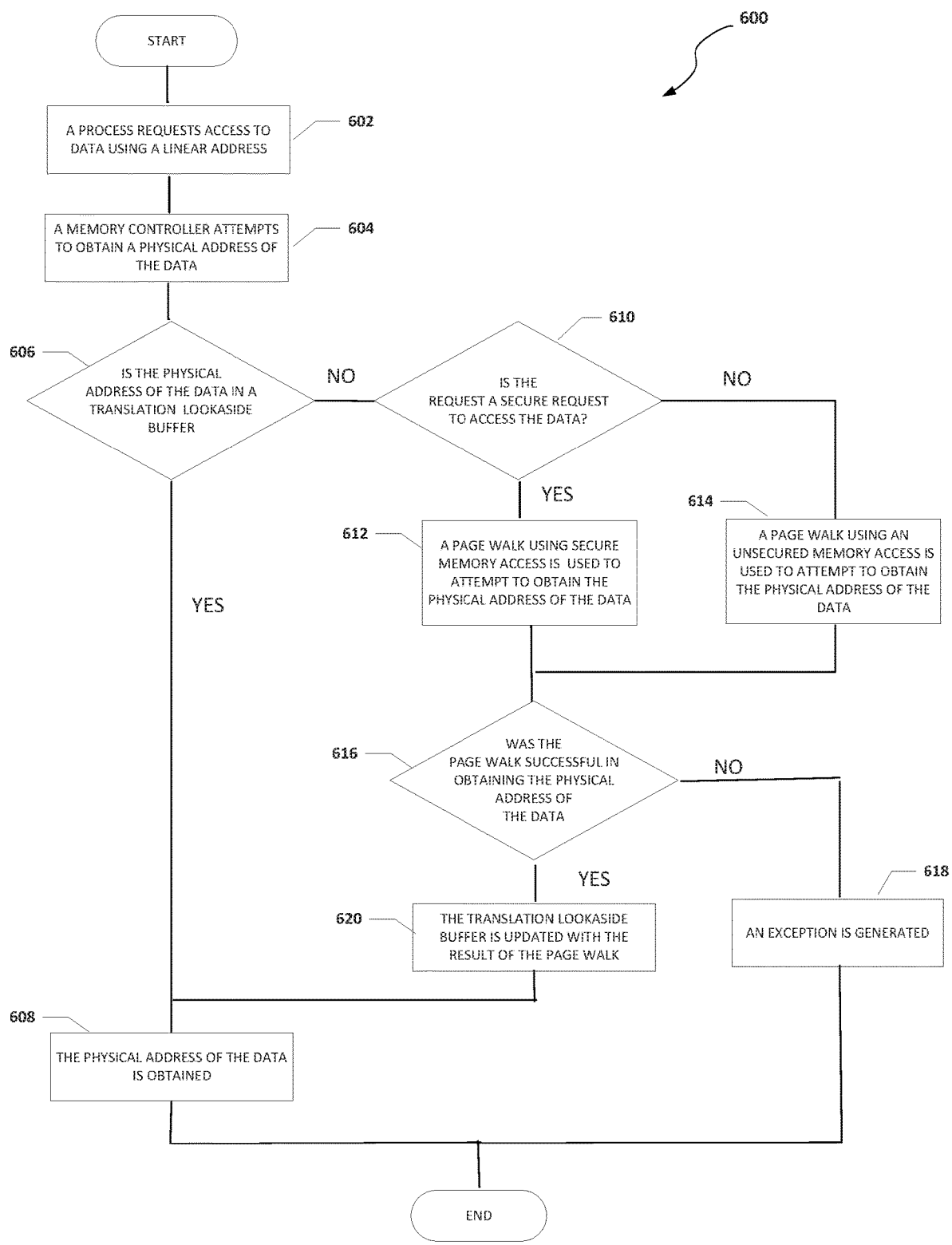
FIG. 6 is a simplified flowchart illustrating potential operations that may be associated with the communication system in accordance with an embodiment.

Turning to FIG. 6, FIG. 6 is an example flowchart illustrating possible operations of a flow 600 that may be associated with the mitigation of cache-latency based side-channel attacks, in accordance with an embodiment. In an embodiment, one or more operations of flow 600 may be performed by security engine 108. At 602, a process requests access to data using a linear address. At 604, a memory controller attempts to obtain a physical address of the data. At 606, the system determines if the physical address of the data is in a TLB. If the system determines that the physical address of the data is in a TLB, then the physical address of the data is obtained, as in 608.

If the physical address of the data is not in a TLB, then the system determines if the request is a secure request to access the data, as in 610. In an example, the secure request is a request that is designed to avoid side-effects in caches, memory and TLBs and helps prevent side channel attacks. More specifically, the secure request is a modified request for the data that will not cause an instruction to be used so that evidence of the data being accessed will not be traced in the cache and the data is not moved to a new location or moved in/within caches when memory access involves a TLB lookup and/or a page-walk. If the request is a secure request to access the data, then a page walk using secure memory access is used to attempt to obtain the physical address of the data, as in 612. In an example, a page walk using a secured memory access to a page directory can be used to attempt to obtain the physical address of the data. If the request is not a secure request to access the data, then a page walk using an unsecured memory access is used to attempt to obtain the physical address of the data. In an example, a page walk using an unsecured memory access to a page directory can be used to attempt to obtain the physical address of the data.

At 616, the system determines if the page walk was successful in obtaining the physical address of the data. If the page walk was successful in obtaining the physical address of the data, then the TLB is updated with the results of the page walk, as in 620 and, at 608, the physical address of the data is obtained. If the page walk was not successful in obtaining the physical address of the data, then an exception is generated as in 618.

Figure 7:
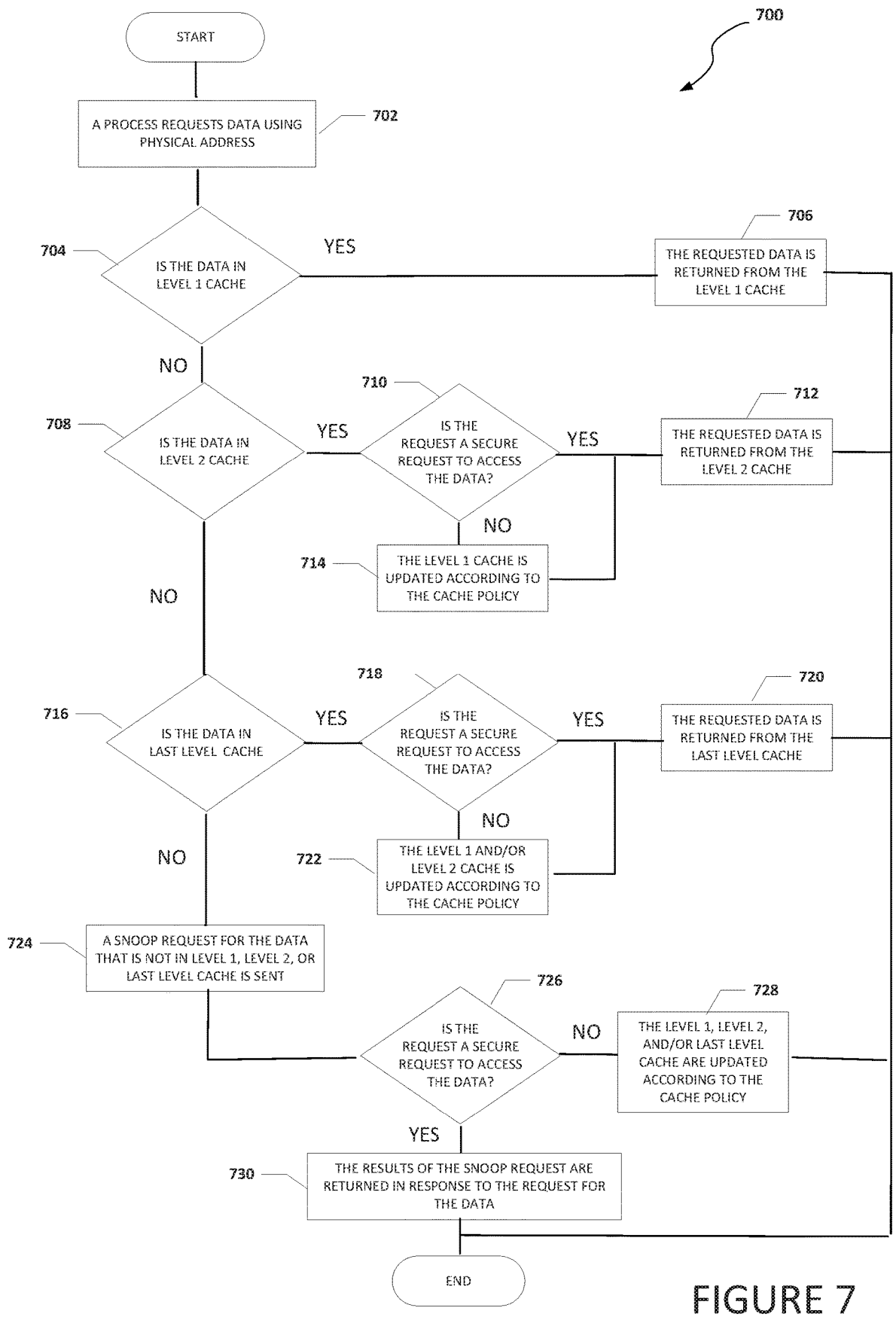
FIG. 7 is a simplified flowchart illustrating potential operations that may be associated with the communication system in accordance with an embodiment.

Turning to FIG. 7, FIG. 7 is an example flowchart illustrating possible operations of a flow 700 that may be associated with the mitigation of cache-latency based side-channel attacks, in accordance with an embodiment. In an embodiment, one or more operations of flow 700 may be performed by security engine 108. At 702, a process requests data using a physical address. At 704, the system determines if the data is in L1 cache. If the data is in the L1 cache, then the requested data is returned from the L1 cache, as in 706. If the data is not in the L1 cache, then the system determines if the data is in L2 cache, as in 708.

If the data is in the L2 cache, then the system determines if the request is a secure request to access the data, as in 710. If the request is a secure request to access the data, then the requested data is returned from the L2 cache, as in 712. If the request is not a secure request to access the data, then the L1 cache is updated according to the cache policy, as in 714 and the requested data is returned from the L2 cache, as in 712. The cache policy is based on architecture dependent rules on how and under which conditions data is moved between cache levels. Typically, more frequently used data is moved closer to the CPU for faster access. One cache policy can state that upon a read, the data is always brought to the L1 cache from the location of the data before the request and subsequent accesses to other memory locations may cause the data's eviction from L1 cache to L2 cache, to LLC, and finally to memory. The cache policy is not a secure request and will cause an unmodified request for data or instruction to be used so that evidence of the data being accessed can be traced in the cache. If the data is not in L2 cache, then the system determines if the data is in LLC, as in 716.

If the data is in LLC, then the system determines if the request is a secure request to access the data, as in 718. If the request is a secure request to access the data, then the requested data is returned from the LLC, as in 720. The requested data can be returned without affecting the cache or causing a change of location of the data in the cache and/or memory. If the request is not a secure request to access the data, then the L1 and/or L2 cache is updated according to the cache policy, as in 722 and the requested data is returned from the LLC cache, as in 720. If the data is not in LLC, then a snoop request for the data that is not in L1, L2, or LLC is sent, as in 724. At 726, the system determines if the request is a secure request to access the data. If the request is not a secure request to access the data, then the L1, L2, and/or LLC are updated according to the cache policy, as in 728. If the request is a secure request to access the data, then the results of the snoop request are returned in response to the request for the data, as in 730. For example, the snoop request to access the data can be modified to a modified snoop request that provides the requested data without affecting the cache or causing a change of location of the data in the cache and/or memory.

Figure 8:
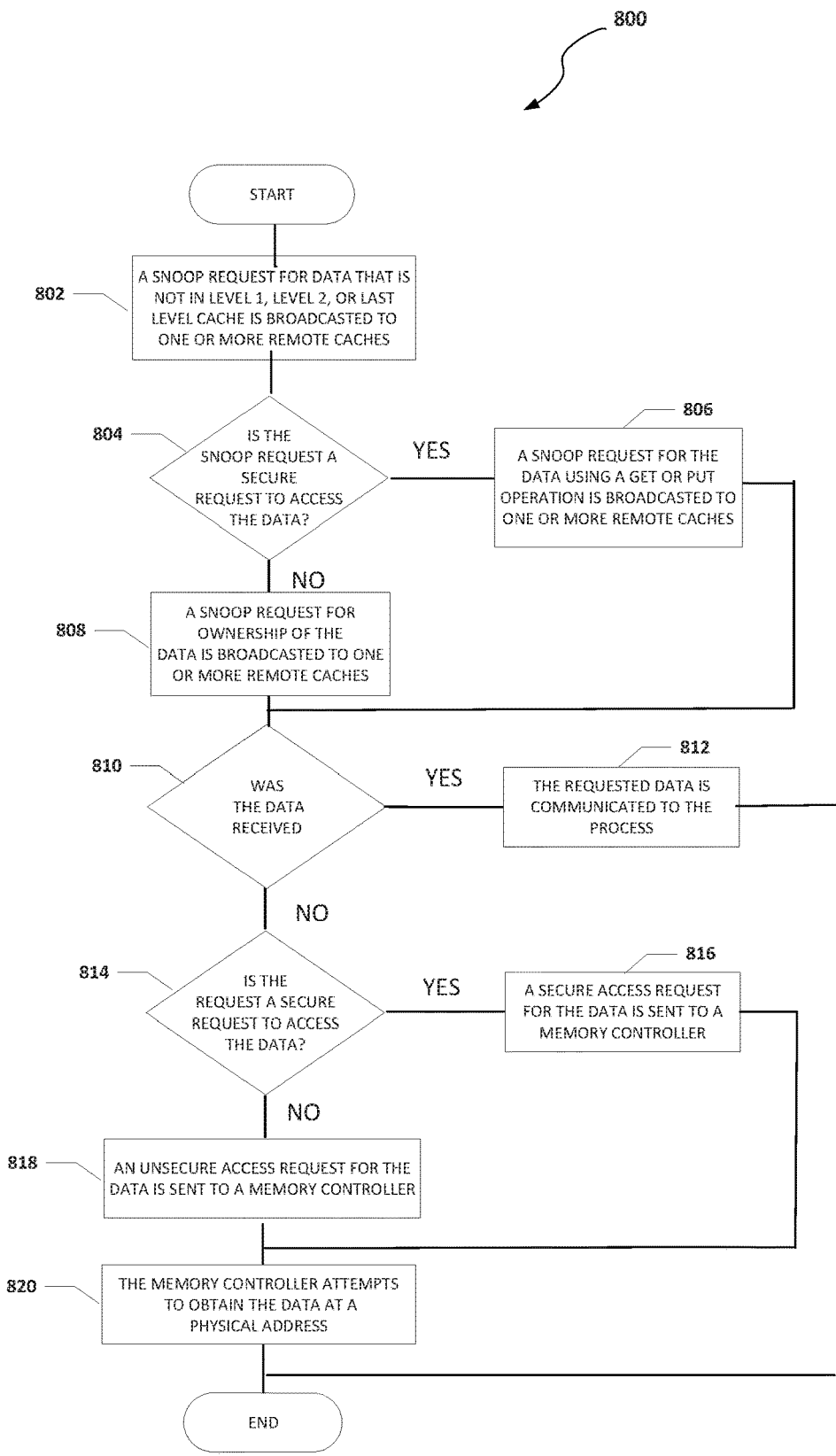
FIG. 8 is a simplified flowchart illustrating potential operations that may be associated with the communication system in accordance with an embodiment.

Turning to FIG. 8, FIG. 8 is an example flowchart illustrating possible operations of a flow 800 that may be associated with the mitigation of cache-latency based side-channel attacks, in accordance with an embodiment. In an embodiment, one or more operations of flow 800 may be performed by security engine 108. At 802, a snoop request for data that is not in L1, L2, or LLC is broadcasted to one or more remote caches. At 804, the system determines if the snoop request is a secure request to access the data. If the snoop request is a secure request to access the data, then a snoop request for the data using a GET or PUT operation is broadcast to one or more remote caches, as in 806. For example, a snoop request from core 104a for the data using a GET or PUT operation (a modified snoop request) can be broadcast to one or more (remote) caches 122b-122d. If the snoop request is not a secure request to access the data, then a snoop request for ownership of the data is broadcast to one or more remote caches, as in 808. For example, a snoop request from core 104a for ownership of the data can be broadcast to one or more (remote) caches 122b-122d. In an example, the snoop request is broadcasted to one or more remote caches that may own data.

At 810, the system determines if the data was received. If the data was received, then the requested data is communicated to the process, as in 812. If the data was not received, then the system determines if the request is a secure request to access the data, as in 814. If the request was a secure request to access the data, then a secure access request for the data is sent to a memory controller, as in 816. If the request is not a secure request to access the data, then an unsecure access request for the data is sent to the memory controller, as in 818. At 820, the memory controller attempts to obtain the data at a physical address. For example, the memory controller may attempt to obtain the physical address of the data as illustrated in 604 of FIG. 6.

Figure 9:
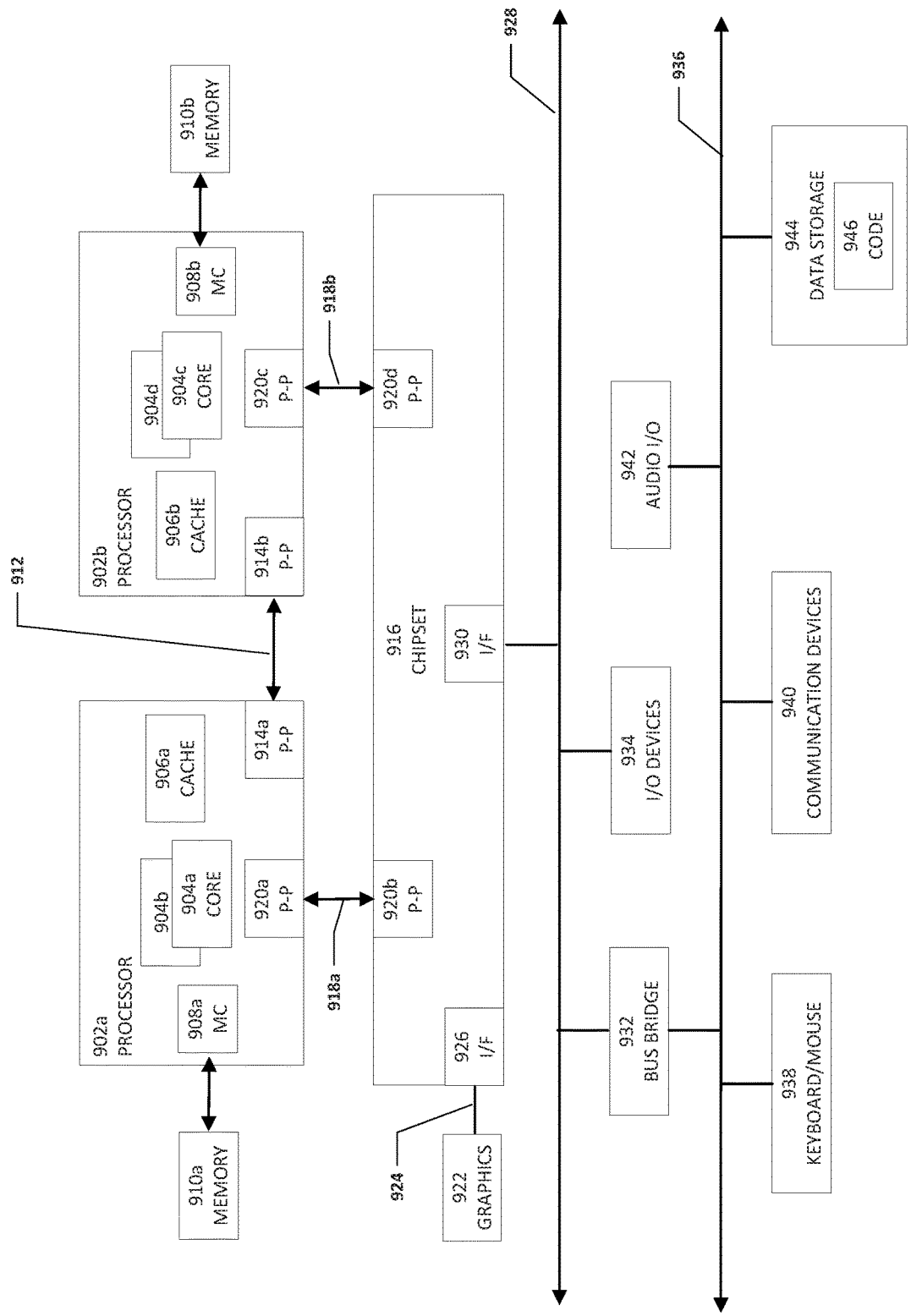
FIG. 9 is a block diagram illustrating an example computing system that is arranged in a point-to-point configuration in accordance with an embodiment.

Turning to FIG. 9, FIG. 9 illustrates a computing system 900 that is arranged in a point-to-point (PtP) configuration according to an embodiment. In particular, FIG. 9 shows a system where processors, memory, and input/output devices are interconnected by a number of point-to-point interfaces. Generally, one or more of the network elements of system 100 may be configured in the same or similar manner as computing system 900.

As illustrated in FIG. 9, system 900 may include several processors, of which only two, processors 902a and 902b, are shown for clarity. While two processors 902a and 902b are shown, it is to be understood that an embodiment of system 900 may also include only one such processor. Processors 902a and 902b may each include a set of cores (i.e., processors cores 904a and 904b and processors cores 904c and 904d) to execute multiple threads of a program. The cores may be configured to execute instruction code in a manner similar to that discussed above with reference to FIGS. 1-8. Each processor 902a and 902b may include at least one shared cache 906a and 906b respectively. Shared caches 906a and 906b may each store data (e.g., instructions) that are utilized by one or more components of processors 902a and 902b, such as processor cores 904a and 904b of processor 902a and processor cores 904c and 904d of processor 902b.

Processors 902a and 902b may also each include integrated memory controller logic (MC) 908a and 908b respectively to communicate with memory elements 910a and 910b. Memory elements 910a and/or 910b may store various data used by processors 902a and 902b. In alternative embodiments, memory controller logic 908a and 908b may be discrete logic separate from processors 902a and 902b.

Processors 902a and 902b may be any type of processor and may exchange data via a point-to-point (PtP) interface 912 using point-to-point interface circuits 914a and 914b respectively. Processors 902a and 902b may each exchange data with a chipset 916 via individual point-to-point interfaces 918a and 918b using point-to-point interface circuits 920a-920d. Chipset 916 may also exchange data with a high-performance graphics circuit 922 via a high-performance graphics interface 924, using an interface circuit 926, which could be a PtP interface circuit. In alternative embodiments, any or all of the PtP links illustrated in FIG. 9 could be implemented as a multi-drop bus rather than a PtP link.

Chipset 916 may be in communication with a bus 928 via an interface circuit 930. Bus 928 may have one or more devices that communicate over it, such as a bus bridge 932 and I/O devices 934. Via a bus 936, bus bridge 932 may be in communication with other devices such as a keyboard/mouse 938 (or other input devices such as a touch screen, trackball, etc.), communication devices 940 (such as modems, network interface devices, or other types of communication devices that may communicate through a network), audio I/O devices 942, and/or a data storage device 944. Data storage device 944 may store code 946, which may be executed by processors 902a and/or 902b. In alternative embodiments, any portions of the bus architectures could be implemented with one or more PtP links.

The computer system depicted in FIG. 9 is a schematic illustration of an embodiment of a computing system that may be utilized to implement various embodiments discussed herein. It will be appreciated that various components of the system depicted in FIG. 9 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 10:
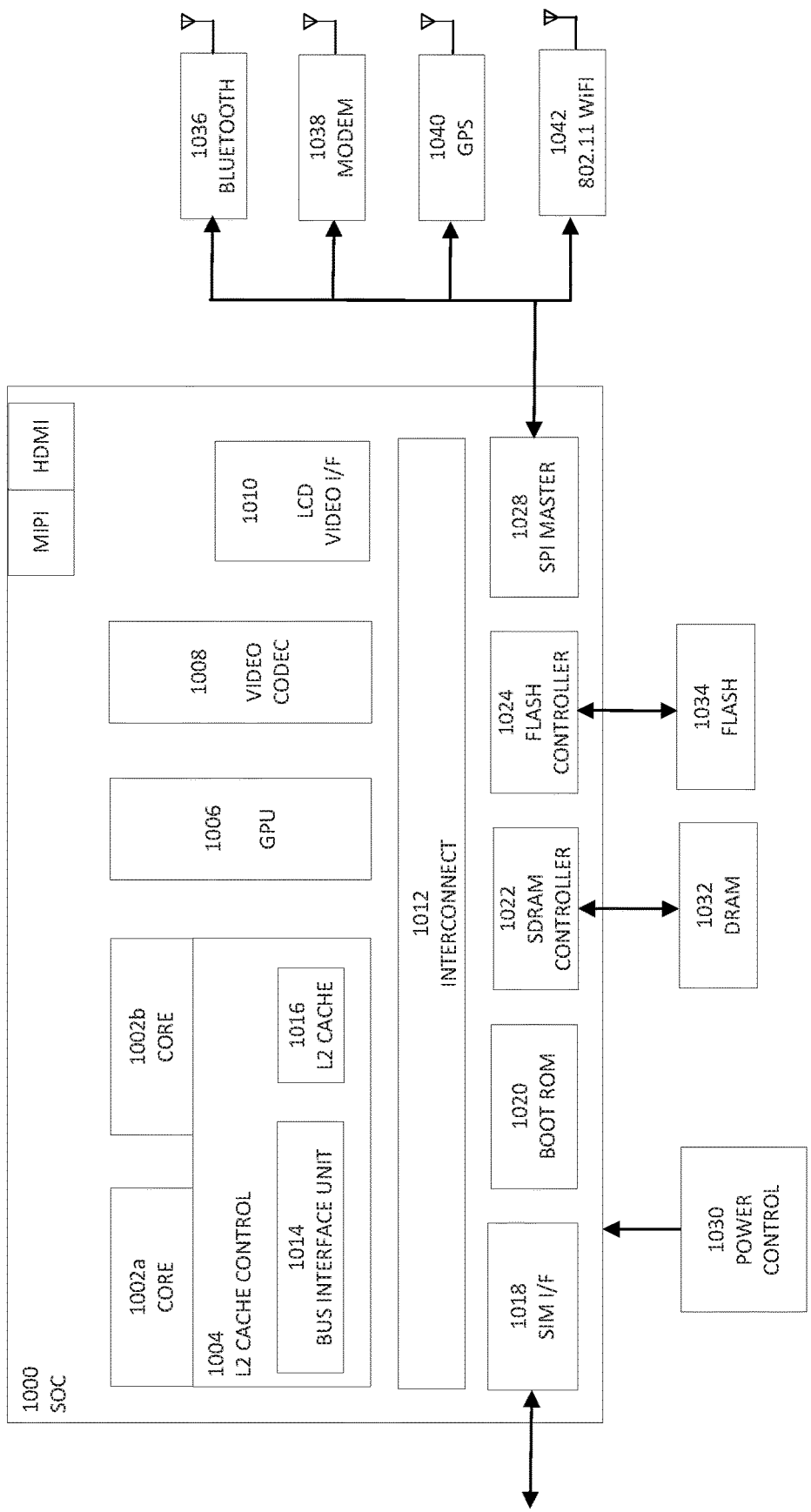
FIG. 10 is a simplified block diagram associated with an example ecosystem system on chip (SOC) of the present disclosure.

Turning to FIG. 10, FIG. 10 is a simplified block diagram associated with an example ecosystem SOC 1000 of the present disclosure. At least one example implementation of the present disclosure can include the device pairing in a local network features discussed herein and an ARM component. For example, the example of FIG. 10 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 10, ecosystem SOC 1000 may include multiple cores 1002a and 1002b, an L2 cache control 1004, a graphics processing unit (GPU) 1006, a video codec 1008, a liquid crystal display (LCD) I/F 1010 and an interconnect 1012. L2 cache control 1004 can include a bus interface unit 1014, a L2 cache 1016. Liquid crystal display (LCD) I/F 1010 may be associated with mobile industry processor interface (MIPI)/high-definition multimedia interface (HDMI) links that couple to an LCD.

Ecosystem SOC 1000 may also include a subscriber identity module (SIM) I/F 1018, a boot read-only memory (ROM) 1020, a synchronous dynamic random-access memory (SDRAM) controller 1022, a flash controller 1024, a serial peripheral interface (SPI) master 1028, a suitable power control 1030, a dynamic RAM (DRAM) 1032, and flash 1034. In addition, one or more embodiments include one or more communication capabilities, interfaces, and features such as instances of Bluetooth™ 1036, a 3G modem 0138, a global positioning system (GPS) 1040, and an 802.11 Wi-Fi 1042.

In operation, the example of FIG. 10 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 11:
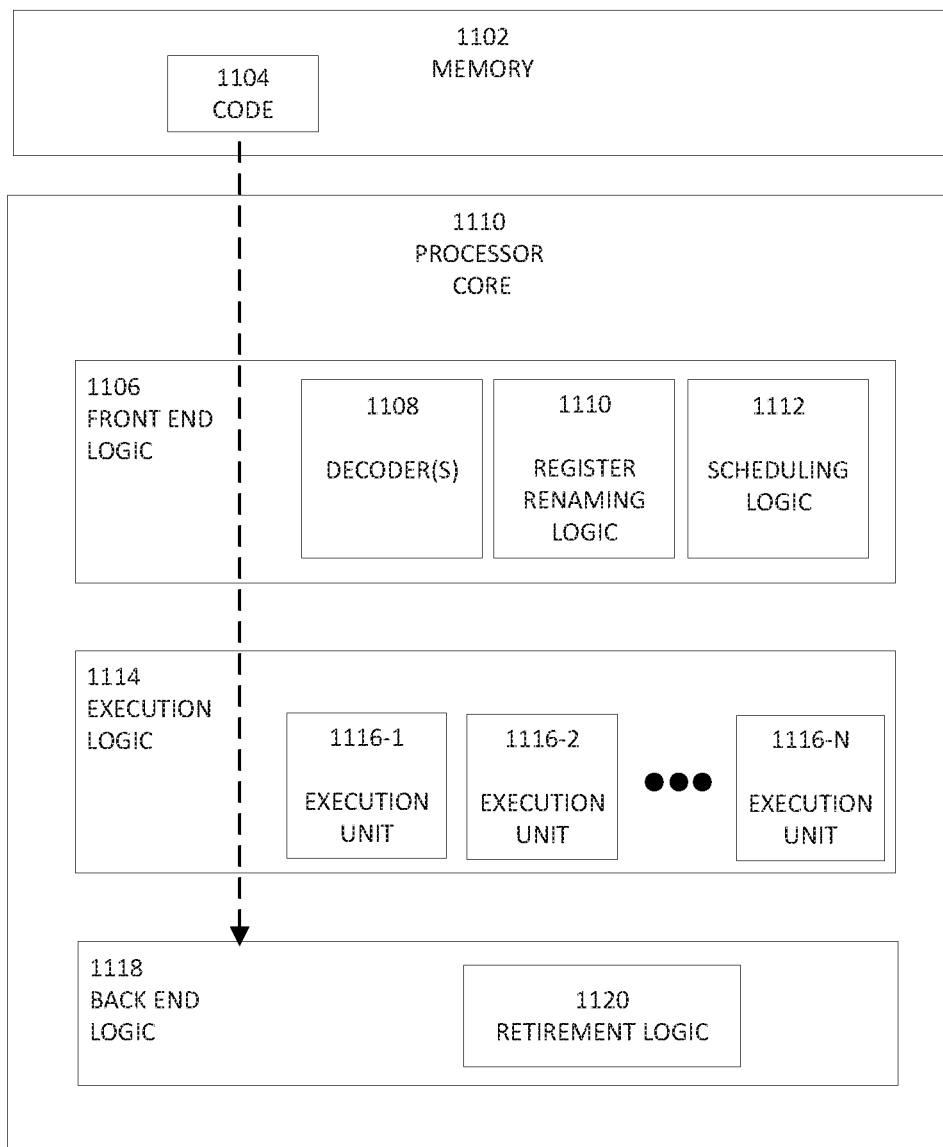
FIG. 11 is a block diagram illustrating an example processor core in accordance with an embodiment.

FIG. 11 illustrates a processor core 1100 according to an embodiment. Processor core 1100 may be the core for any type of processor, such as a micro-processor, an embedded processor, a digital signal processor (DSP), a network processor, or other device to execute code. Although only one processor core 1100 is illustrated in FIG. 11, a processor may alternatively include more than one of the processor core 1100 illustrated in FIG. 11. For example, processor core 1100 represents one example embodiment of processors cores 974a, 974b, 984a, and 984b shown and described with reference to processors 902a and 902b of FIG. 9. Processor core 1100 may be a single-threaded core or, for at least one embodiment, processor core 1100 may be multithreaded in that it may include more than one hardware thread context (or "logical processor") per core.

FIG. 11 also illustrates a memory 1102 coupled to processor core 1100 in accordance with an embodiment. Memory 1102 may be any of a wide variety of memories (including various layers of memory hierarchy) as are known or otherwise available to those of skill in the art. Memory 1102 may include code 1104, which may be one or more instructions, to be executed by processor core 1100. Processor core 1100 can follow a program sequence of instructions indicated by code 1104. Each instruction enters a front-end logic 1106 and is processed by one or more decoders 1108. The decoder may generate, as its output, a micro operation such as a fixed width micro operation in a predefined format, or may generate other instructions, microinstructions, or control signals that reflect the original code instruction. Front-end logic 1106 also includes register renaming logic 1110 and scheduling logic 1112, which generally allocate resources and queue the operation corresponding to the instruction for execution.

Processor core 1100 can also include execution logic 1114 having a set of execution units 1116-1 through 1116-N. Some embodiments may include a number of execution units dedicated to specific functions or sets of functions. Other embodiments may include only one execution unit or one execution unit that can perform a particular function. Execution logic 1114 performs the operations specified by code instructions.

After completion of execution of the operations specified by the code instructions, back-end logic 1118 can retire the instructions of code 1104. In one embodiment, processor core 1100 allows out of order execution but requires in order retirement of instructions. Retirement logic 1120 may take a variety of known forms (e.g., re-order buffers or the like). In this manner, processor core 1100 is transformed during execution of code 1104, at least in terms of the output generated by the decoder, hardware registers and tables utilized by register renaming logic 1110, and any registers (not shown) modified by execution logic 1114.

Although not illustrated in FIG. 11, a processor may include other elements on a chip with processor core 1100, at least some of which were shown and described herein with reference to FIG. 9. For example, as shown in FIG. 9, a processor may include memory control logic along with processor core 1100. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that system 100 and its teachings are readily scalable and can accommodate a large number of components, as well as more complicated/sophisticated arrangements and configurations. Accordingly, the examples provided should not limit the scope or inhibit the broad teachings of system 100 and as potentially applied to a myriad of other architectures.

It is also important to note that the operations in the preceding flow diagrams (i.e., FIGS. 3-8) illustrate only some of the possible correlating scenarios and patterns that may be executed by, or within, system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although system 100 have been illustrated with reference to particular elements and operations that facilitate the communication process, these elements and operations may be replaced by any suitable architecture, protocols, and/or processes that achieve the intended functionality of system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example C1 is at least one machine readable medium having one or more instructions that when executed by at least one processor cause the at least one processor to receive a request for data from a linear address, where the request will cause a translation of the linear address to a physical address and move the data to a register and a cache and/or memory that has a lower access latency than a current access latency for the data and modify the request for the data to a modified request, where the modified request provides the requested data without causing a change of location of the data in the cache and/or memory.

In Example C2, the subject matter of Example C1 can optionally include where the data is already in a level 1 cache, level 2 cache, or last level cache and a cache state does not change.

In Example C3, the subject matter of any one of Examples C1-C2 can optionally include one or more instructions that when executed by the least one processor, causes the least one processor to broadcast a snoop request to acquire the data when the data is not found in the cache, where the snoop request is a modified snoop request that disables data movement of the data between different levels of remote caches and eviction from the remote caches.

In Example C4, the subject matter of any one of Examples C1-C3 can optionally include where the snoop request is a read request and not a request for ownership of the data.

In Example C5, the subject matter of any one of Examples C1-C4 can optionally include can optionally include one or more instructions that when executed by the least one processor, causes the least one processor to prevent a change to a translation lookaside buffer when the data was obtained using a linear to physical address translation.

In Example C6, the subject matter of any one of Examples C1-05 can optionally include where a page walk is used to help identify the physical address of the requested data.

In Example C7, the subject matter of any one of Example C1-C6 can optionally include where malware monitors the cache for changes.

In Example A1, an electronic device can include memory, a security engine, and at least one processor. The processor is configured to receive requests for data and move the requested data to a cache located in the processor. The security engine is configured to cause the at least one processor to receive a first request to access first data at a specified first linear address, perform a translation of the first linear address to a first physical address, forward the first request to access the first data to the cache, where the cache includes a plurality of layers with each layer having a different access latency, determine a current location of the first data in cache layers or memory layers, move the first data to a first register and a cache and/or memory that has a lower access latency than a current access latency for the first data, receive a second request to access second data at a specified second linear address, perform a second translation of the second linear address to a second physical address, and modify the second request for the second data such that the second data is moved into a second register but the modified second request does not cause the cache to change a location of second data in the cache and memory, receive a first request to access first data at a specified first linear address, perform a translation of the first linear address to a first physical address, forward the first request to access the first data to the cache, where the cache includes a plurality of layers with each layer having a different access latency, determine a current location of the first data in cache layers or memory layers, move the first data to a first register and a cache and/or memory that has a lower access latency than a current access latency for the first data, receive a second request to access second data at a specified second linear address, perform a second translation of the second linear address to a second physical address, and modify the second request for the second data such that the second data is moved into a second register but the modified second request does not cause the cache to change a location of second data in the cache and memory.

In Example, A2, the subject matter of Example A1 can optionally include where the second data is already in a level 1 cache, level 2 cache, or last level cache and a cache state does not change.

In Example A3, the subject matter of any one of Examples A1-A2 can optionally include where the security engine if further configured to cause the processor to broadcast a snoop request to acquire the second data when the second data is not found in the cache, where the snoop request is a modified snoop request that disables data movement of the second data between different levels of other processor's caches and eviction from caches.

In Example A4, the subject matter of any one of Examples A1-A3 can optionally include where the snoop request is a read request and not a request for ownership of the second data.

In Example A5, the subject matter of any one of Examples A1-A4 can optionally include where the security engine is further configured to cause the least one processor to prevent a change to a translation lookaside buffer when the second data was obtained using a linear to physical address translation.

In Example A6, the subject matter of any one of Examples A1-A5 can optionally include where the first data is moved to a cache and memory that has a lower access latency than the current access latency for the first data.

In Example A7, the subject matter of any one of Examples A1-A6 can optionally include where a page walk is used to help identify a physical address of the requested data.

In Example A8, the subject matter of any one of Examples A1-A7 can optionally include where malware monitors the cache for changes.

Example M1 is a method including receiving a request for data, where the request will cause a cache in a processor to change states, where the cache includes a plurality of layers with each layer having a different access latency and modifying the request for the data such that the request does not cause the cache to change state.

In Example M2, the subject matter of Example M1 can optionally include where the requested data is already in a level 1 cache, level 2 cache, or last level cache and the cache does not change.

In Example M3, the subject matter of any one of the Examples M1-M2 can optionally include broadcasting a snoop request to acquire the requested data.

In Example M4, the subject matter of any one of the Examples M1-M3 can optionally include where the snoop request is a read request and not a request for ownership of the data.

In Example M5, the subject matter of any one of the Examples M1-M4 can optionally include where preventing a change to a translation lookaside buffer when the data was obtained using a linear to physical address translation.

In Example M6, the subject matter of any one of the Examples M1-M5 can optionally include where malware monitors the cache for changes.

In Example M7, the subject matter of any one of the Examples M1-M6 can optionally include where malware flushed the cache before monitoring the cache for changes.

Example S1 is a system for mitigation of cache-latency based side-channel attacks, the system including means for receiving a request for data, where the request will cause a cache in a processor to change states, where the cache includes a plurality of layers with each layer having a different access latency and means for modifying the request for the data such that the request does not cause the cache to change state.

In Example S2, the subject matter of Example S1 can optionally include where the requested data is already in a level 1 cache, level 2 cache, or last level cache and the cache state does not change.

In Example S3, the subject matter of any of the Examples S1-S2 can optionally include a translation lookaside buffer, where the modified request prevents a change to the translation lookaside buffer when the data was obtained using a linear to physical address translation.

Example AA1 is an electronic device including means for receiving a request for data from a linear address, where the request will cause a translation of the linear address to a physical address and move the data to a register and a cache and/or memory that has a lower access latency than a current access latency for the data and means for modifying the request for the data to a modified request, where the modified request provides the requested data without causing a change of location of the data in the cache and/or memory.

In Example AA2, the subject matter of Example AA1 can optionally include where the data is already in a level 1 cache, level 2 cache, or last level cache and a cache state does not change.

In Example AA3, the subject matter of any one of Examples AA1-AA2 can optionally include means for broadcasting a snoop request to acquire the data when the data is not found in the cache, where the snoop request is a modified snoop request that disables data movement of the data between different levels of remote caches and eviction from the remote caches.

In Example AA4, the subject matter of any one of Examples AA1-AA3 can optionally include where the snoop request is a read request and not a request for ownership of the data.

In Example AA5, the subject matter of any one of Examples AA1-AA4 can optionally include means for preventing a change to a translation lookaside buffer when the data was obtained using a linear to physical address translation.

In Example AA6, the subject matter of any one of Examples AA1-AA5 can optionally include where a page walk is used to help identify the physical address of the requested data.

In Example AA7, the subject matter of any one of Example AA1-AA6 can optionally include where malware monitors the cache for changes.

Example X1 is a machine-readable storage medium including machine-readable instructions to implement a method or realize an apparatus as in any one of the Examples A1-A7, AA1-AA7 or M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory machine readable medium comprising one or more instructions that when executed by a processor that includes registers and a cache, causes the processor to:
   receive a request for data from a linear address, wherein the request will cause a translation of the linear address to a physical address and move the data to a cache and/or memory that has a lower access latency than a current access latency for the data;
   determine if the data is protected data; and
   modify the request for the data to a modified request when the data is protected data, wherein, if the protected data is in a specific cache, the modified request includes a snapshot request and if the protected data is not in the specific cache, the modified request is a request for the protected data to be directly loaded from memory, wherein the specific cache can be the cache or a different cache, wherein the modified request provides the requested protected data without causing a change of location of the protected data in the cache and/or memory and the cache does not include trace evidence of the data being accessed.

2. The at least one machine readable medium of claim 1, wherein the protected data is already in a level 1 cache, level 2 cache, or last level cache and a cache state does not change.

3. The at least one machine readable medium of claim 1, further comprising one or more instructions that when executed by the processor, causes the processor to:
   broadcast a modified snoop request to acquire the protected data when the protected data is not found in the cache, wherein the modified snoop request disables movement of the protected data between different levels of remote caches and eviction from the remote caches.

4. The at least one machine readable medium of claim 3, wherein the modified snoop request is a read request and not a request for ownership of the protected data.

5. The at least one machine readable medium of claim 1, further comprising one or more instructions that when executed by the processor, causes the processor to:
   prevent a change to a translation lookaside buffer when the protected data was obtained using a linear to physical address translation.

6. The at least one machine readable medium of claim 5, wherein a page walk is used to help identify the physical address of the requested protected data.

7. The at least one machine readable medium of claim 1, wherein malware monitors the cache for changes.

8. An electronic device comprising:
   memory;
   a security engine; and
   at least one processor, wherein the processor is configured to receive requests for data and move the requested data to a cache located in the processor, wherein the security engine is configured to cause the least one processor to:
   receive a first request to access first data at a specified first linear address;
   perform a translation of the first linear address to a first physical address;
   forward the first request to access the first data to the cache, wherein the cache includes a plurality of layers with each layer having a different access latency;
   determine a current location of the first data in cache layers or memory layers;

move the first data to a first register and a cache and/or memory that has a lower access latency than a current access latency for the first data;

receive a second request to access second data at a specified second linear address;

perform a second translation of the second linear address to a second physical address;

determine that the second data is protected data; and modify the second request for the second data such that if the second data is in a specific cache, the modified second request includes a snapshot request and if the second data is not in the specific cache, the modified second request is a request for the second data to be directly loaded from memory, wherein the specific cache can be the cache or a different cache, and the modified second request does not cause the cache to change a location of the second data and the cache does not include evidence of the data being accessed.

9. The electronic device of claim 8, wherein the second data is already in a level 1 cache, level 2 cache, or last level cache and a cache state does not change.

10. The electronic device of claim 8, wherein the security engine is further configured to cause the least one processor to:

broadcast a modified snoop request to acquire the second data when the second data is not found in the cache, wherein the modified snoop request disables movement of the second data between different levels of other processor's caches and eviction from caches.

11. The electronic device of claim 10, wherein the modified snoop request is a read request and not a request for ownership of the second data.

12. The electronic device of claim 8, wherein the security engine is further configured to cause the least one processor to:

prevent a change to a translation lookaside buffer when the second data was obtained using a linear to physical address translation.

13. The electronic device of claim 8, wherein the first data is moved to a cache and memory that has a lower access latency than the current access latency for the first data.

14. The electronic device of claim 8, wherein a page walk is used to help identify a physical address of the requested data.

15. The electronic device of claim 8, wherein malware monitors the cache for changes.

16. A method comprising:

receiving a request for data, wherein the request will cause a cache in a processor to change states, wherein the cache includes a plurality of layers with each layer having a different access latency;

determining if the data is protected data; and modifying the request for the data when the data is protected data, wherein, if the protected data is in a specific cache, the modified request includes a snapshot request and if the protected data is not in the specific cache, the modified request is a request for the protected data to be directly loaded from memory, wherein the specific cache can be the cache or a different cache, wherein the modified request does not cause the cache to change state and the cache does not include evidence of the protected data being accessed.

17. The method of claim 16, wherein the requested protected data is already in a level 1 cache, level 2 cache, or last level cache and the cache does not change.

18. The method of claim 16, further comprising:

broadcasting a modified snoop request to acquire the requested protected data, wherein the modified snoop request is a read request and not a request for ownership of the protected data.

19. The method of claim 16, further comprising:

preventing a change to a translation lookaside buffer when the protected data was obtained using a linear to physical address translation.

20. The method of claim 16, wherein malware monitors the cache for changes.

21. The method of claim 20, wherein malware flushed the cache before monitoring the cache for changes.

22. A system for mitigation of cache-latency based side-channel attacks, the system comprising:

means for receiving a request for data, wherein the request will cause a cache in a processor to change states, wherein the cache includes a plurality of layers with each layer having a different access latency;

means for determining if the data is protected data; and means for modifying the request for the data when the data is protected data, wherein, if the protected data is in a specific cache, the modified request includes a snapshot request and if the protected data is not in the specific cache, the modified request is a request for the protected data to be directly loaded from memory, wherein the specific cache can be the cache or a different cache, wherein the modified request does not cause the cache to change state and the cache does not include evidence of the protected data being accessed.

23. The system of claim 22, wherein the requested data is already in a level 1 cache, level 2 cache, or last level cache and the cache state does not change.

24. The system of claim 22, further comprising:

a translation lookaside buffer, wherein the modified request prevents a change to the translation lookaside buffer when the data was obtained using a linear to physical address translation.

25. The at least one machine readable medium of claim 1, wherein the request is not modified when the data is not protected data, wherein the request provides the requested data and causes a change of location of the data in the cache and/or memory.

* * * * *